United States Patent [19]

Inumochi et al.

[11] Patent Number: 5,161,076
[45] Date of Patent: Nov. 3, 1992

[54] MAGNETIC HEAD SLIDER SUSPENSION APPARATUS AND METHOD OF FABRICATION

[75] Inventors: Mitsuo Inumochi; Tsukasa Matsuura; Shinsuke Yura; Munehito Kumagai, all of Hyogo, Japan

[73] Assignee: Mitsubishi Denki Kabushiki Kaisha, Japan

[21] Appl. No.: 537,047

[22] Filed: Jun. 12, 1990

[30] Foreign Application Priority Data

Jun. 13, 1989 [JP] Japan ................... 1-150256

[51] Int. Cl.$^5$ ..................... G11B 5/48; G11B 21/16
[52] U.S. Cl. ..................... 360/104; 360/103; 29/603
[58] Field of Search ............... 360/103, 104, 105, 106, 360/110; 26/603

[56] References Cited

U.S. PATENT DOCUMENTS

| | | | |
|---|---|---|---|
| 3,489,381 | 1/1970 | Jones et al. | 360/103 |
| 3,581,298 | 5/1971 | Billawala | 360/103 |
| 4,280,156 | 7/1981 | Villette | 360/103 |
| 4,305,102 | 12/1981 | Suzuki | 360/106 |
| 4,630,158 | 12/1986 | Spash | 360/103 |
| 4,740,854 | 4/1988 | Shibaya et al. | 360/104 |
| 5,027,238 | 6/1991 | Konishi et al. | 360/103 |
| 5,057,953 | 10/1991 | Wanlass | 360/104 |
| 5,079,659 | 1/1992 | Hagen | 360/104 |

FOREIGN PATENT DOCUMENTS 61-187070 11/1986 Japan.

Primary Examiner—Aristotelis Psitos
Assistant Examiner—Alfonso Garcia
Attorney, Agent, or Firm—Wolf, Greenfield & Sacks

[57] ABSTRACT

A magnetic head suspension according to the present disclosure includes a protrusion provided at the center of a flexure for mounting and supporting a magnetic head slider or on the tip end of a load beam for exerting a given load on the magnetic head slider such that the tip end of the protrusion is a support point, further including a fixing section for fixing said flexure on the tip end of said load beam and a magnetic head slider mounting section separated from said fixing section through a stepped portion.

17 Claims, 4 Drawing Sheets $L_1 \times F > L_2 \times F$

MAGNETIC HEAD SLIDER SUSPENSION APPARATUS AND METHOD OF FABRICATION

BACKGROUND OF THE INVENTION

1. Field of the Invention

The present invention relates to a magnetic head suspension for supporting a magnetic head slider.

2. Description of the Prior Art

Referring to FIGS. 9 and 10, a conventional magnetic head suspension, disclosed for example in Japanese Laid-Open Utility Model Publication No. 61-187070, is illustrated, the former figure being a top view and the latter a side view. Referring further to FIGS. 11 and 12, a tip end flexure portion shown in FIGS. 9, 10 is illustrated in an enlarged view, the former figure being a top view and the latter a side view. In each figure, designated at 1 is a magnetic head slider for recording information on a magnetic recording medium (not shown) and reading (reproducing) information recorded on the magnetic recording medium, 1a is a air bearing surface of the magnetic head slider 1 directed in a confronting relation with the magnetic recording medium, 2 is a load beam for exerting a predetermined load on the magnetic head slider 1 to push the magnetic head slider 1 against the magnetic recording medium, 3 is a flexure having one end fixed to the tip end of the load beam 2 and the other end protruding from the tip end of the load beam 2 and thereafter folded back to support the magnetic head slider 1, 4 is a mounting section provided on the other end of the flexure 3 at the center of same for mounting the magnetic head slider 1 by bonding, and 5 is a dimple provided on the mounting section 4 for making smooth the movement of the magnetic head slider 1.

Conventionally, in such a magnetic head suspension, for making smooth the movement of the magnetic head slider 1, the dimple 5 comprising a protrusion is provided on the mounting section 4 serving to bond the magnetic head slider 1 of the flexure 3, and the (tip end 5t) of the dimple 5 is formed on the side of the mounting section for closest to the load beam 2, i.e., so as to make contact with the beam 2.

In such a manner, the conventional magnetic head supsension includes the dimple on the flexure to make smooth the movement of the magnetic head slider. However, the protrusion of the mounting section for closest to the dimple is formed on the side of the load beam so as to make contact with the load beam, so that there is increased a distance between the top (tip end 5t) of the dimple protrusion and an air bearing surface of the magnetic head slider which causes unstable operation of the magnetic head slider. Thus, the conventional magnetic head suspension has a problem that the behavior of the magnetic head slider is unstable upon its flying and is liable to cause head crash.

SUMMARY OF THE INVENTION

In view of the drawbacks of the prior art, it is an object of the present invention to provide a magnetic head suspension capable of improving the operation characteristics of a magnetic head slider and of preventing any head crush from being produced by approaching the operating support point of the magnetic head slider toward the air bearing surface of the same.

A magnetic head suspension according to one aspect of the present invention includes a load beam for exerting a predetermined load on a magnetic head slider, a flexure fixedly mounted on the tip end of the load beam and adapted to mount and support the magnetic head slider, a protrusion located at the center of the flexure for smoothly moving the magnetic head slider, the protrusion being provided at the center of the flexure or on the tip end of the load beam and adapted to face the back surface of the magnetic head slider mounted on the flexure such that the tip end of the protrusion is a support point.

Furthermore, a magnetic head suspension according to another aspect of the present invention includes besides the aforementioned construction a fixing section for fixing the flexure to the tip end of the load beam and a magnetic head slider mounting section disposed, separated away from said fixing section through a stepped portion.

The above and other objects, features, and advantages of the invention will become more apparent from the following description when taken in conjunction with the accompanying drawings.

DESCRIPTION OF THE PREFERRED EMBODIMENT

Figure 1:
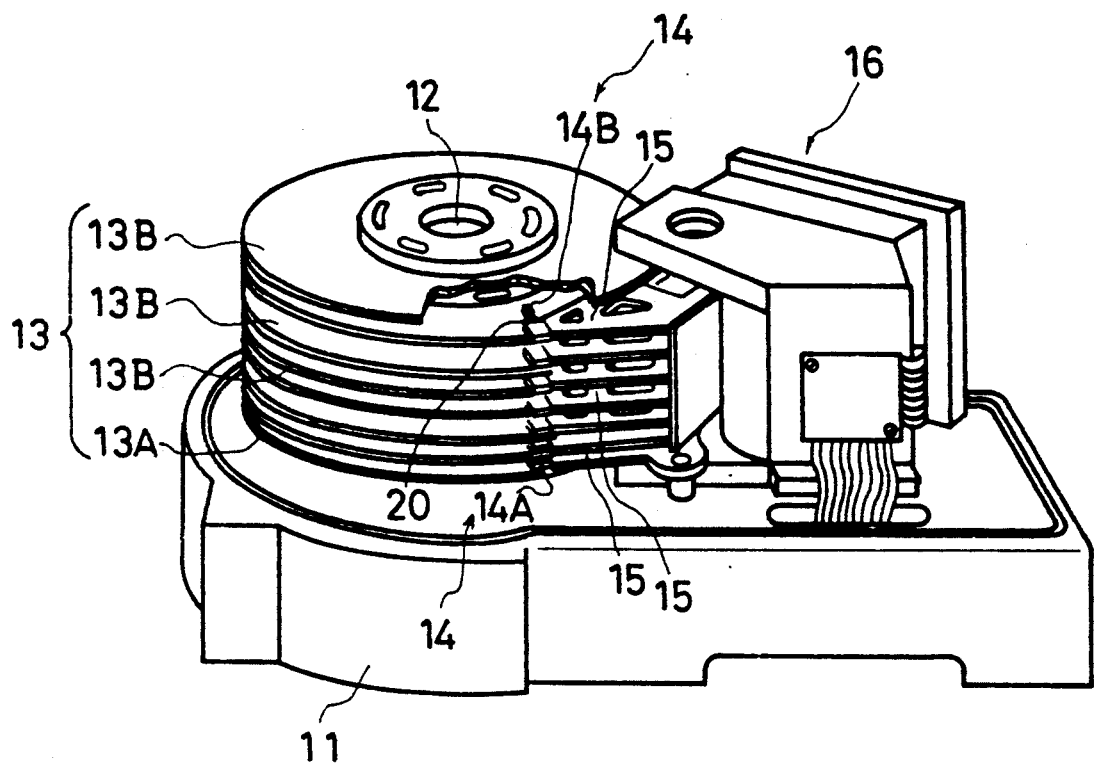
FIG. 1 is a view illustrating the whole of a magnetic disk drive associated with the present invention.

Referring to FIG. 1, the whole construction of a magnetic disk drive according to the present invention is illustrated.

As illustrated in the figure, designated 11 is a base including therein a rotative drive source (not shown) such as a spindle motor, and 12 is a rotary shaft rotated by the rotative drive source on which a plurality of magnetic disks 13 are mounted axially at a given interval. Arbitrary one among the magnetic disks 13 is of a servo disk 13A, and another of a data disk 13B. A servo signal is recorded on a plurality of tracks of the servo disk 13A, while various data are written into and read from a plurality of data tracks of the data disk 13B.

Additionally, designated at 14 are a plurality of magnetic head sliders provided such that each holds a magnetic head and faces the surface and back of each magnetic disk. The magnetic head slider 14, that faces the servo disk 13A, among the magnetic head sliders 14 is of a servo head slider 14A for detection of positional information, while the other being of a data head slider 14B facing the data disk 13B. Each magnetic head slider 14 is held on the tip end of a plate-shaped head slider holder section 15, and allowed to face a desired track of the magnetic disk 13 by being moved radially about the magnetic disk 13 by a head slider drive section 16 such as a voice coil motor. The magnetic head slider 14 is supported by a magnetic head slider suspension 20 described below.

Figure 2:
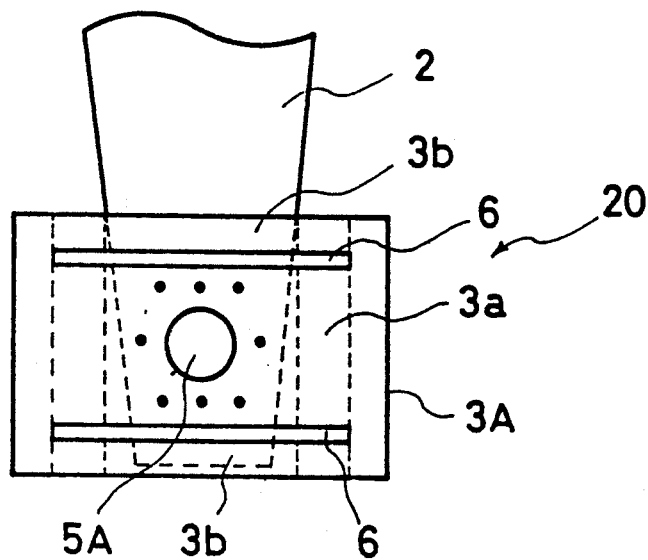
FIGS. 2, 3, and 4 are top, side, perspective views each illustrating portions of a magnetic head slider suspension according to an embodiment of the present invention.
Figure 3:
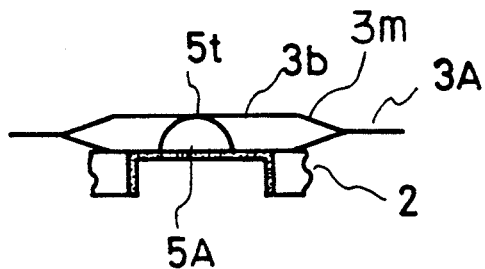
Figure 4:
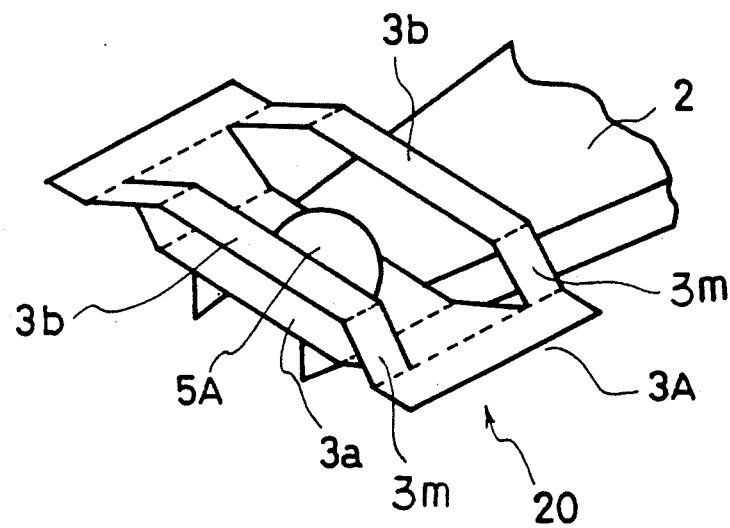

Referring to FIGS. 2 to 4, portions of a magnetic head slider suspension 20 according to an embodiment of the present invention are illustrated, in which FIG. 2 is a top view, FIG. 3 is a side view, and FIG. 4 is a perspective view. In each figure, designated at 2 is a load beam, 3A is a flexure, 3a is a fixing section of the flexure 3A fixedly mounted on the tip end of the load beam 2, 3b is a magnetic head slider mounting section of the flexure 3A separated from the fixing section 3a through a stepped portion formed on opposite sides of the fixing section 3a, and 5A is a protrusion located at the center of the flexure 3A such that the tip end 5t of the protrusion faces the back of the magnetic slider back surface, for the purpose of making smooth the movement of the magnetic head slider. This is a dimple in the present case. In the present embodiment, the flexure 3A comprising a rectangular flat plate is adapted to include parallel slits 6 not extending to the opposite ends of the flexure to portion the center of the flexure 3A, i.e., define the fixing section 3a and the mounting section 3b, and further form the dimple 5A at the center of the flexure with the fixing section 3a. The folded portion 3m raises the mounting section 3b. The fixing section 3a and the mounting section 3b are partitioned by the slits 6 so as to be parallel and form a stepped portion vertically. Additionally, the dimple 5A and the mounting section 3b are protruded in the same direction with respect to the fixing section 3a such that the tip end 5t of the dimple 5A is a fulcrum, and are formed to be equal in their height.

When the magnetic head slider is mounted on the suspension in the present embodiment, i.e., on the magnetic head slider mounting section 3b of the flexure 3A, the tip end of the dimple 5A makes contact with the back 1a of the magnetic head slider 1 so that an operation support point of the magnetic head slider 1 is more approached to a floating surface of the magnetic head slider 1. Therefore, the movement of the magnetic head slider is made smooth and stable to sharply improve the operation characteristics of the magnetic head slider upon its flying. Thus, head crash can be prevented to assure a high reliability magnetic head slider.

Figure 5:
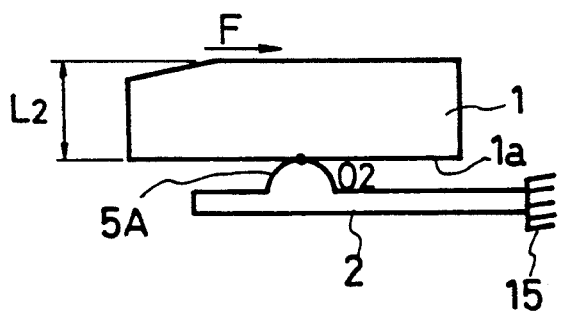
FIG. 5 is a side view illustrating a positional relationship between a magnetic head slider and a protrusion in the present invention.
Figure 13:
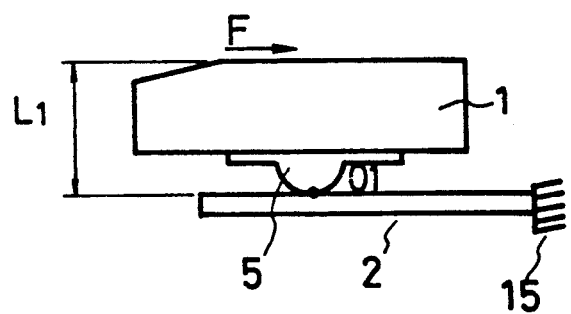
FIG. 13 is a side view illustrating a positional relationship between a magnetic head slider and a protrusion in the conventional case.

The above situation will be described with reference to the accompanying drawings. Referring to FIG. 5, a positional relationship between the magnetic head slider and the protrusion in the present embodiment is illustrated in the form of a side view, and referring to FIG. 13, a positional relationship between a conventional magnetic head slider and a projection is illustrated in the form of a side view. In the figures, denoted at F is force exerted on the magnetic head slider 1, $0_1$ is an attitude operation support point of the conventional magnetic head slider, $0_2$ is an attitude operation support point of the magnetic head slider in the present embodiment, $L_1$ is a distance between an application point of the force F in the conventional case and the operation support point $0_1$ and $L_2$ is a distance between an application point of the force F in the present embodiment and the operation support point $0_2$, moments of the forces being expressed by $L_1 \times F$ and $L_2 \times F$, respectively. It should be noticed that the distance $L_1$ in the conventional magnetic head slider suspension is longer than the distance $L_2$ in the present embodiment, and hence the moments in the conventional case and in the present embodiment satisfy a relation: $L_1 \times F > L_2 \times F$ with the assumption of the exerted forces F being the same. In other words, in the conventional magnetic head slider suspension the moment $L_1 \times F$ is greater even under smaller frictional force F to result in a unstable operation of the magnetic head slider while in the present embodiment the moment $L_2 \times F$ is smaller than the conventional moment $L_1 \times F$ to result in a stable operation of the magnetic head slider for assuring a high reliability magnetic head slider device.

In the following, an assembly process of the magnetic head suspension will be described. A material of the flexure (3) is first selected. For the material quality of the flexure (3), there are selected materials which are very resilient, and are capable of being cut and blanked and of being changed with ease in their shapes under application of pressure and upon folding. For example, there is available a metallic plate spring. Then, the plate spring is cut into a desired shape. Further, there is formed the slit (6) by blanking which partitions the fixing section (3a) and the mounting section (3b). The protrusion (5) is formed by application of pressing force to the center of the fixing section from one surface to the other. The mounting section (3b) is also formed by being moved by pressing such that it is parallel to the fixing section (3a) in the direction of the protrusion (5). The load beam (2) is joined with the fixing section (3a) of the flexure (3) formed as such and the magnetic head slider (1) is joined with the mounting section (3b), hereby constructing the magnetic head suspension.

Herein, in the above assembly process, the cutting of the plate spring and the blanking through the slit can be made simultaneously. The formation of the protrusion and the formation, by moving, of the fixing section and the mounting section can also be made simultaneously. Furthermore, all these machinings of cutting, blanking, protrusion formation, and formation by moving can be made simultaneously in one process.

Additionally, in the present embodiment, formation of the flexure 3A including the dimple 5A, i.e., monolithic molding can be eased together with easy assembling of a magnetic head slider device and hence with an improvement of accuracy of the assembling.

Figure 6:
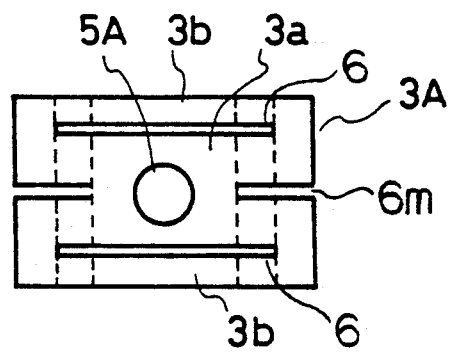
FIGS. 6 to 8 are flat views and a side view illustrating a flexure according to another embodiment of the present invention.
Figure 7:
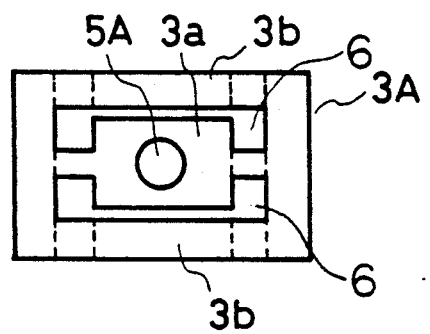
Figure 8:
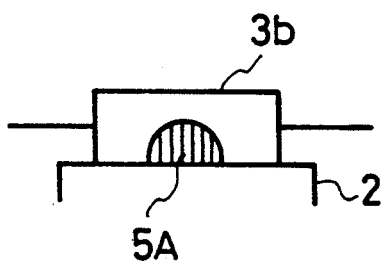
Figure 9:
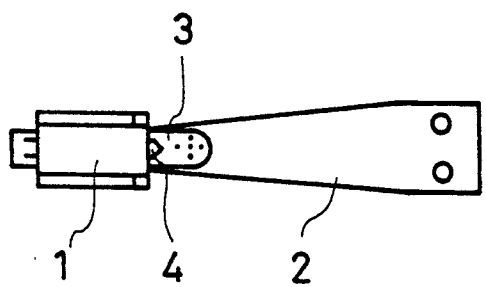
FIGS. 9 and 10 are top and side view each illustrating portions of a conventional magnetic head slider suspension.
Figure 10:
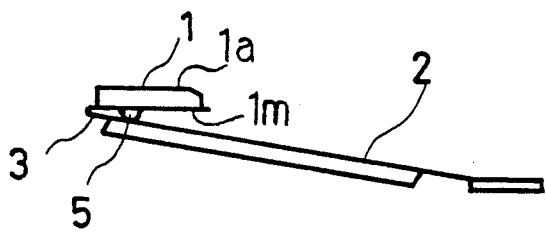
Figure 11:
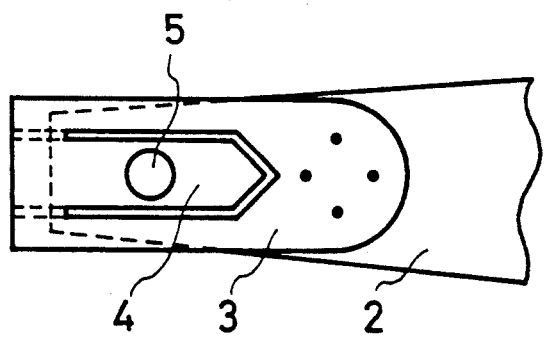
FIGS. 11 and 12 are enlarged top and side views each illustrating the portions of FIGS. 9 and 10.
Figure 12:
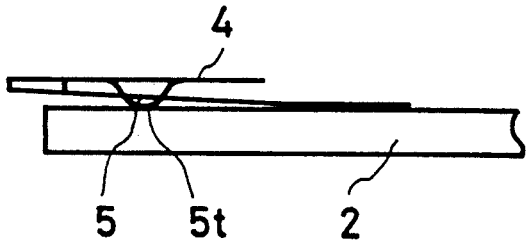

Referring now to FIGS. 6 to 8, another embodiment is illustrated. FIGS. 6 and 7 are plan views exhibiting the shape of the flexure 3A, and FIG. 8 is a side view illustrating the same. In the case shown in the figures, a folded portion of the flexure 3A is directed vertically and the magnetic head slider mounting section 3b is constructed to be higher than the tip end of the dimple 5A. Hereby, the present embodiment also manifests the same effect as in the aforementioned embodiment. In FIG. 6 a notch 6m is additionally formed, and in FIG. 7 the slit 6 is shaped such that its opposite ends are progressively wider toward the inside thereof.

Herein, although in the above embodiments, the magnetic head slider mounting section 3b was directed perpendicularly to the load beam 2, it may be directed parallely.

According to the present invention, as described above, there are provided the load beam to exert a given load on the magnetic head slider, the flexure fixedly mounted on the tip end of the load beam for mounting and supporting the magnetic head slider, and the protrusion located at the center of the flexure for making smooth the movement of the magnetic head slider. Additionally, the protrusion is provided at the center of the flexure or at the tip end of the load beam and is adapted to face the back of the magnetic head slider mounted on the flexure such that the tip end of the protrusion is the fulcrum. Hereby, the air bearing surface of the magnetic head slider and the operation support point are approached to improve the operation characteristics of the magnetic head slider upon its flying. Thus, a high reliability magnetic head slider device which can prevent any head crash from being produced is assured.

Furthermore, there are provided the fixing section fixedly mounted on the tip end of the load beam, and the magnetic head slider mounting section separated from the fixing section through the stepped portion. Thus, the magnetic head slider device can be assembled with ease to improve assembling accuracy.

What is claimed is:

1. A head suspension for accessing a storage medium, comprising:
   (a) a head slider having two opposing sides, one side being a slider side facing the storage medium and the other side being a back side;
   (b) a flexure for mounting thereon the head slider and allowing for rotational movement of the head slider, said flexure including:
      (b1) means defining a mounting surface for receiving said head slider and having two raised surfaces defining a first plane;
      (b2) means defining a fixing surface defining a second plane, wherein said planes are substantially parallel;
      (b3) a flexible stepped portion connecting said mounting surface to said fixing surface for allowing the mounting surface to move relative to the fixing surface thereby changing a distance between the planes; and
      (b4) a projection projecting toward and contacting the back side of the head slider to serve as a fulcrum of the head slider and allowing rotational movement of the head slider, wherein said projection is disposed between said two raised surfaces; and
      (b5) wherein said means defining a mounting surface, said means defining a fixing surface, and said flexible stepped portion being unitary; and
   (c) a load beam connected to and supporting the fixing surface.

2. A head suspension for accessing a storage medium, comprising:
   (a) head slider means having a slider side facing the storage medium and a back side, opposite the slider side;
   (b) flexure means for mounting the head slider means and allowing rotational movement of the head slider means, said flexure means including:
      (b1) means defining a mounting surface for receiving said head slider means and having two raised surfaces defining a first plane;
      (b2) means defining a fixing surface defining a second plane, wherein the planes are substantially parallel;
      (b3) a projection projecting toward and contacting the back side of the head slider means to serve as a fulcrum of the head slider means and allowing rotational movement of the head slider means, wherein said projection is disposed between said two raised surfaces; and
      (b4) a flexible stepped portion connecting said mounting surface to said fixing surface for allowing the mounting surface to move relative to the fixing surface thereby changing a distance between the planes; and
      (b5) wherein said means defining a mounting surface, said means defining a fixing surface, and said flexible stepped portion being unitary; and
   (c) a beam means connected to and supporting the fixing surface.

3. A head suspension of claim 2 wherein said means defining a mounting surface includes means defining two mounting surface strips located on opposite sides of said protruding means.

4. A head suspension of claim 3 wherein said beam means attaches to said fixing surface at one end of said beam means and extends in a first direction therefrom, and wherein said two mounting surface strips extend in a second direction substantially perpendicular to said first direction.

5. A head suspension of claim 4 wherein said mounting surface strips are spaced apart from one another along said first direction.

6. A head suspension for accessing a storage medium, comprising:
   (a) head slider having opposite sides, one side being a slider side facing the storage medium and the other side being a back side;
   (b) a flexure including:
      (b1) a fixing portion having a surface defining a first plane;
      (b2) a mount portion for mounting the head slider and having two raised surfaces defining a second plane, wherein said planes are substantially parallel;
      (b3) a flexible stepped portion connected to said fixing portion and said mount portion for allowing the mount portion to move relative to the fixing portion thereby changing a distance between said planes;
      (b4) a projection projecting toward and contacting the back side of the head slider to serve as a fulcrum of the head slider and allowing rotational movement of the head slider, wherein said projection is disposed between said two raised surfaces; and
      (b5) said fixing portion, said mount portion and said flexible stepped portion being unitary; and
   (c) a load beam connected to the fixing portion of the flexure.

7. A head suspension of claim 6, wherein the spring portion is located between the fixing portion and the mount portion.

8. A head suspension of claim 6, wherein the projection is located at mid-portion of the fixing portion.

9. A head suspension of claim 6, wherein the projection accesses a mid-portion of the back side.

10. A head suspension of claim 6, wherein the mount portion has an opening formed through the mount portion at a mid-portion of the same through which the projection directly accesses the back side of the head slider.

11. A head suspension of claim 6, wherein the mount portion has at least two contact portions in contact with the fixing portion; and the projection is located at a mid-portion between the contact portions.

12. A head suspension for reading/writing data from-/into a storage medium comprising:

(a) a head slider having a slider side facing the storage medium and a back side opposite the slider side;
(b) a flexure including:
  (b1) a fixing portion having a surface defining a first plane;
  (b2) a mount portion for mounting the head slider, the mount portion having an opening for allowing direct access to the back side therethrough and having two raised surfaces defining a second plane, wherein said planes are substantially parallel;
  (b3) a flexible stepped portion connected to the mount portion and the fixing portion for allowing the mount portion to change relative to the fixing portion thereby changing a distance between said planes; and
  (b4) said fixing portion, said mount portion and said flexible stepped portion being unitary;
(c) a loadbeam connected to the fixing portion to hold the flexure; and
(d) a projection projecting toward and contacting the back side of the head slider to allow rotational movement of the head slider relative to the flexure, said projection located between said two raised surfaces.

13. A method of manufacturing a head suspension, comprising the steps of:
(a) making a flexure, including the steps of:
  (a1) selecting a plate spring having opposite sides;
  (a2) cutting the plate spring into predetermined portions including a fixing portion, a bending portion and a mount portion, such that the fixing portion, the mount portion and the bending portion are unitary, and wherein the fixing portion has a surface defining a first plane, and the mount portion has two raised surfaces defining a second plane, and wherein the planes are substantially parallel;
  (a3) forming a projection at the fixing portion, the projection projecting out from one side of the plate spring; and
  (a4) bending the bending portion to form a flexible stepped portion connected to said fixing portion and said mount portion for allowing the mount portion to move relative to the fixing portion thereby changing a distance between said planes;
(b) mounting a head slider on the mount portion so that the projection projects toward and contacts a back side of the head slider and allows for rotational movement of the head slider, wherein said projection is disposed between said two raised surfaces; and
(c) attaching the fixing portion to a load beam.

14. A method of claim 13, wherein the manufacturing step comprises a step of simultaneously performing at least two steps from the group of the cutting step, the forming step, and the bending step.

15. A method of claim 13, wherein the cutting step comprises:
(a) shaping an outline of the plate spring; and
(b) punching out a slit to form the fixing portion and the mount portion.

16. A magnetic head suspension comprising a load beam exerting a given load on a movable magnetic head slider having opposite sides, one side being a slider side facing a storage medium and the other side being a back side, a flexure fixedly mounted on a tip end of the load beam for mounting and supporting the magnetic head slider, the flexure including: a fixing portion having a surface defining a first plane, a mount portion for mounting the head slider and having two raised surfaces defining a second plane, wherein said planes are substantially parallel, a flexible stepped portion connected to said fixing portion and said mount portion for allowing the mount portion to move relative to the fixing portion thereby changing a distance between said planes, and a projection projecting toward and contacting the back side of the head slider to serve as a fulcrum of the head slider and allowing rotational movement of the head slider, wherein said projection is disposed between said two raised surfaces, and said fixing portion, said mount portion and said flexible stepped portion being unitary.

17. A magnetic head suspension comprising a load beam for exerting a given load on a movable magnetic head slider having opposite sides, one side being a slider side facing a storage medium and the other side being a back side, a flexure fixedly mounted on a tip end of the load beam for mounting and supporting the magnetic head slider, the flexure including: a fixing portion having a surface defining a first plane, a mount portion for mounting the head slider and having two raised surfaces defining a second plane, wherein said planes are substantially parallel, a flexible stepped portion connected to said fixing portion and said mount portion for allowing the mount portion to move relative to the fixing portion thereby changing a distance between said planes, and a projection projecting toward and contacting the back side of the head slider to serve as a fulcrum of the head slider and allowing rotational movement of the head slider, wherein said projection is disposed between said two raised surfaces, and said fixing portion, said mount portion and said flexible stepped portion being unitary.

* * * * *